US010013382B2

(12) United States Patent
Tung

(10) Patent No.: US 10,013,382 B2
(45) Date of Patent: Jul. 3, 2018

(54) SMART PLUG NODE MANAGEMENT

(71) Applicant: Quanta Computer Inc., Taoyuan (TW)

(72) Inventor: Yen-Ping Tung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 251 days.

(21) Appl. No.: 15/140,220

(22) Filed: Apr. 27, 2016

(65) Prior Publication Data
US 2017/0315951 A1    Nov. 2, 2017

(51) Int. Cl.
G06F 13/00   (2006.01)
G06F 13/40   (2006.01)
G06F 13/42   (2006.01)
G06F 13/38   (2006.01)
H04L 12/24   (2006.01)

(52) U.S. Cl.
CPC .......... G06F 13/4081 (2013.01); G06F 13/00 (2013.01); G06F 13/382 (2013.01); G06F 13/385 (2013.01); G06F 13/4282 (2013.01); H04L 41/00 (2013.01)

(58) Field of Classification Search
None
See application file for complete search history.

(56) References Cited

U.S. PATENT DOCUMENTS 5,384,697 A * 1/1995 Pascucci .................. G06F 9/465
                                                        700/10
5,590,292 A * 12/1996 Wooten ............... G06F 13/4022
                                                       370/419
2005/0198247 A1* 9/2005 Perry .................... H04L 7/0008
                                                       709/223
2006/0098572 A1  5/2006 Zhang et al.
(Continued)

FOREIGN PATENT DOCUMENTS

JP   2007536612 A   12/2007
JP   2008504072 A    2/2008
(Continued)

OTHER PUBLICATIONS

JP Office Action for Application No. 2017-088686, dated Mar. 13, 2018, w/ First Office Action Summary.

*Primary Examiner* — Michael Sun
(74) *Attorney, Agent, or Firm* — Nixon Peabody LLP; Eduardo J. Quiñones; Zhou Lu

(57) ABSTRACT

In the maintenance of rack system, a computing device may implement a plurality of smart plugs and a communication bus in a system. A smart plug may be plugged into a server node for communication between a management node and a designated server node. The communication bus may be coupled to the smart plugs for transmitting I2C packets. A server node may be associated with a corresponding smart plug that includes a unique address on the communication bus. The smart plug may be configured to receive a message via the communication bus. The smart plug is configured to (Continued)

determine whether the request is addressed to a unique address associated with the smart plug. Upon determining that the message is addressed to the unique address, the smart plug may reformat the request compatible with server node port using the local address. Reformatting request may depend on types of server node ports.

20 Claims, 6 Drawing Sheets

(56) References Cited

U.S. PATENT DOCUMENTS

| | | |
|---|---|---|
| 2009/0171151 A1 | 7/2009 | Choset et al. |
| 2010/0118153 A1 | 5/2010 | Yu |
| 2010/0235493 A1* | 9/2010 | Besaw ............... H04L 41/0273 709/224 |
| 2010/0235555 A1 | 9/2010 | Nguyen |
| 2011/0063126 A1* | 3/2011 | Kennedy ............... G01D 4/002 340/870.02 |
| 2013/0245849 A1* | 9/2013 | Paul ......................... H02J 3/14 700/295 |
| 2016/0020828 A1* | 1/2016 | Colombo ............... H04B 3/544 375/257 |
| 2016/0370833 A1* | 12/2016 | Lu ........................... G06F 1/266 |

FOREIGN PATENT DOCUMENTS

| | | | |
|---|---|---|---|
| JP | 2008545319 A | 12/2008 |
| JP | 2010119103 A | 5/2010 |
| JP | 2015154127 A | 8/2015 |

\* cited by examiner

SMART PLUG NODE MANAGEMENT

TECHNICAL FIELD

This application relates to managing a server node, and more particularly to communicating with a server node using a smart plug device.

BACKGROUND

In remote management of server nodes, locating and accessing a server node in a typical rack system may not be readily straightforward due to the large number of server nodes present in typical rack systems. Thus, in some rack systems, a management backplane may be configured to locate server nodes in the rack system. The management backplane is typically a printed circuit board (PCB) that connects server nodes to the management node. Often times, the management backplane adds a layer of complexity to the rack system, increasing both financial and manpower costs for maintaining the rack system.

SUMMARY OF THE INVENTION

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In accordance with one or more aspects of the examples described herein, systems and methods are provided for managing a server node in a rack system. The computing device can include a management node and a plurality of computing nodes, where the management nodes and the plurality of computing nodes each have a port and a local address for out-of-band communications associated with the port. The computing device can further include a communications bus and a plurality of smart plugs, where the plurality of smart plugs can couple the management node and/or the plurality of computing nodes to the communications bus. Each of the plurality of smart plugs can have a unique address on the communications bus, and can be configured to receive a request message via the communications bus, determine whether the request message is addressed to the unique address, and (in response to determining whether the message is addressed to the unique address), reformat the request message compatible with the port using the local address.

The smart plug can be configured to receive a node information request from a management node, compare the node information request with the computing nodes connected to the smart plug and, if a matching computing node is found, transmit the node information request to the port of the matching computing node using the local address for the respective computing node. Moreover, the smart plug can be configured to reformat the request message compatible with a USB port using the local address.

In some embodiments, the one of the plurality of smart plugs may be a USB to I2C convertor, the USB to I2C converter having a pre-configured unique I2C slave address. The smart plug is further configured to reformat the request message compatible with an I2C port using the local address. Also, a smart plug can have a complex programmable logic device (CPLD) that converts the unique address to a controller address associated with the each of the plurality of computing nodes. The controller associated with the each of the plurality of computing nodes can be, for example, a baseboard management controller (BMC). The computing device may include a communication cable that is an I2C bus. The computing device may include the smart plug which is configured to detect a current connection status of each of the plurality of computing nodes to the management node. The computing device may include the smart plug configured to receive a response message from the port in response to receiving the request message, reformat the response message compatible with the management node, and transmit the response message to the management node.

BRIEF DESCRIPTION OF THE DRAWINGS

Various embodiments in accordance with the present disclosure will be described with reference to the drawings, in which.

DETAILED DESCRIPTION

Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

Figure 1:
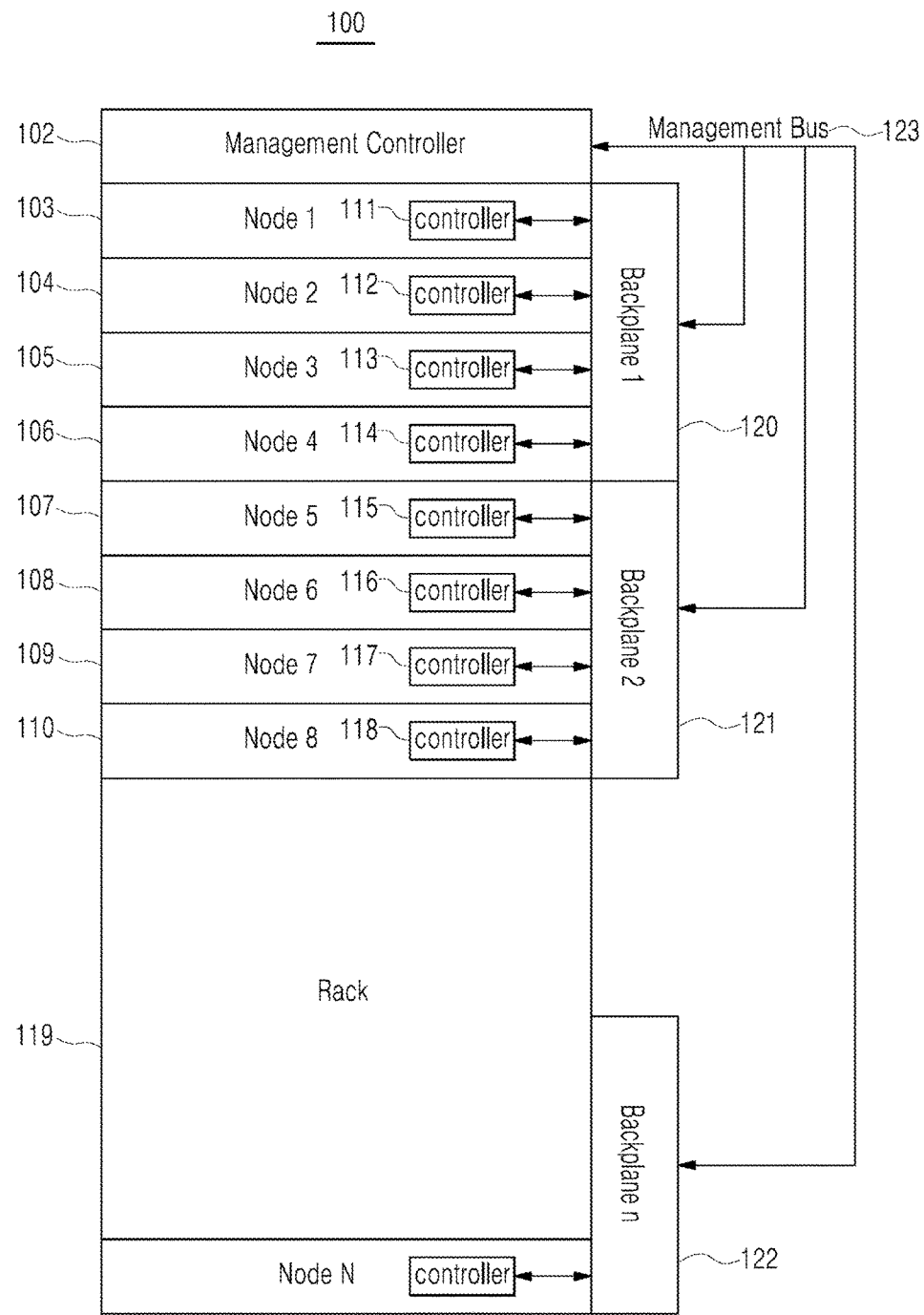
FIG. 1 illustrates a block diagram of exemplary embodiment of a traditional management backplane rack system configurations.

The disclosure turns first to FIG. 1, which illustrates a block diagram of exemplary embodiment of locating a server node in a traditional management backplane rack system 100. As shown in the block diagram 100, a rack system 119 is provided, which is an assembly of supporting components designed to be individually mounted to the rack system. It provides structural relationship between a plurality of server nodes and a management node. As shown in FIG. 1, a traditional backplane rack system 119 may include a plurality of server nodes 103-110, a controller within each of the server nodes, 111-118, a management node (e.g. management controller) 102 that is connected to the plurality of server nodes 103-110 through a management backplane 120-122, and a management bus 123 that connects the management backplane 120-122 to the management controller 102.

Each of server nodes 103-110 may include a controller 111-118 that may communicate with the management backplanes 120-122 for transporting data between the nodes (e.g. management controller 102). The controllers 111-118 can be service or management processors (e.g., a baseboard management processor) that operate independently of the CPU to support management tasks for the server. For example, the controllers can be baseboard management controllers (BMC) configured to provide out-of-band management/administration.

In some configurations, the management controller (management node) 102 may be a management module that includes a Rack Management Controller (RMC) or Top-of-Rack (TOR) Switch. The management node 102 can address node location of each server node in the rack system. The management node 102 may send a request message (e,g. I2C packets) to the server nodes when it needs to retrieve some information from the server node or identify a server node with the requested information.

The management node 102 is typically coupled to a plurality of server nodes 103-110 through a management backplane 120-122. The management backplane 120-122 is a Printed Circuit Board (PCB) that connects the plurality of server nodes 103-110 to the management controller 102 using a standard connector. Some management backplanes include a Chassis Management Controller (CM) to proxy management packets to the server nodes. Some management backplanes may only use electronic circuits to transmit the management packets to the server nodes.

The management backplane 120-122 may be connected to the management controller 102 through a management bus 123. The management bus 123 is a system management cable that transfers data between the management backplane and the management node. The types of bus signal implemented herein can be USB, I2C, RS232, Can Bus, RS485, or Ethernet. The types of bus signal listed here is not an exhaustive list and there can be other types of signal methods for the management bus.

As shown in FIG. 1, the management backplane may address a server node location on behalf of the management node 102. However, there may be some difficulties in locating the server nodes due to the location of the management backplane in a rack system. The management backplane is often located in a rear side of the rack system, and thus, it may not be easy to design around the rack system. In some embodiments, the server node may be a standardized server node that uses a standard port for receiving/sending data. Thus, the server node may not include a suitable port to implement a more effective communication and management system. Thus, the present technology provides an effective communication mechanism for locating and communicating with a server node using a smart plug device and a rack management cable, while eliminating the need for backplanes.

Figure 2:
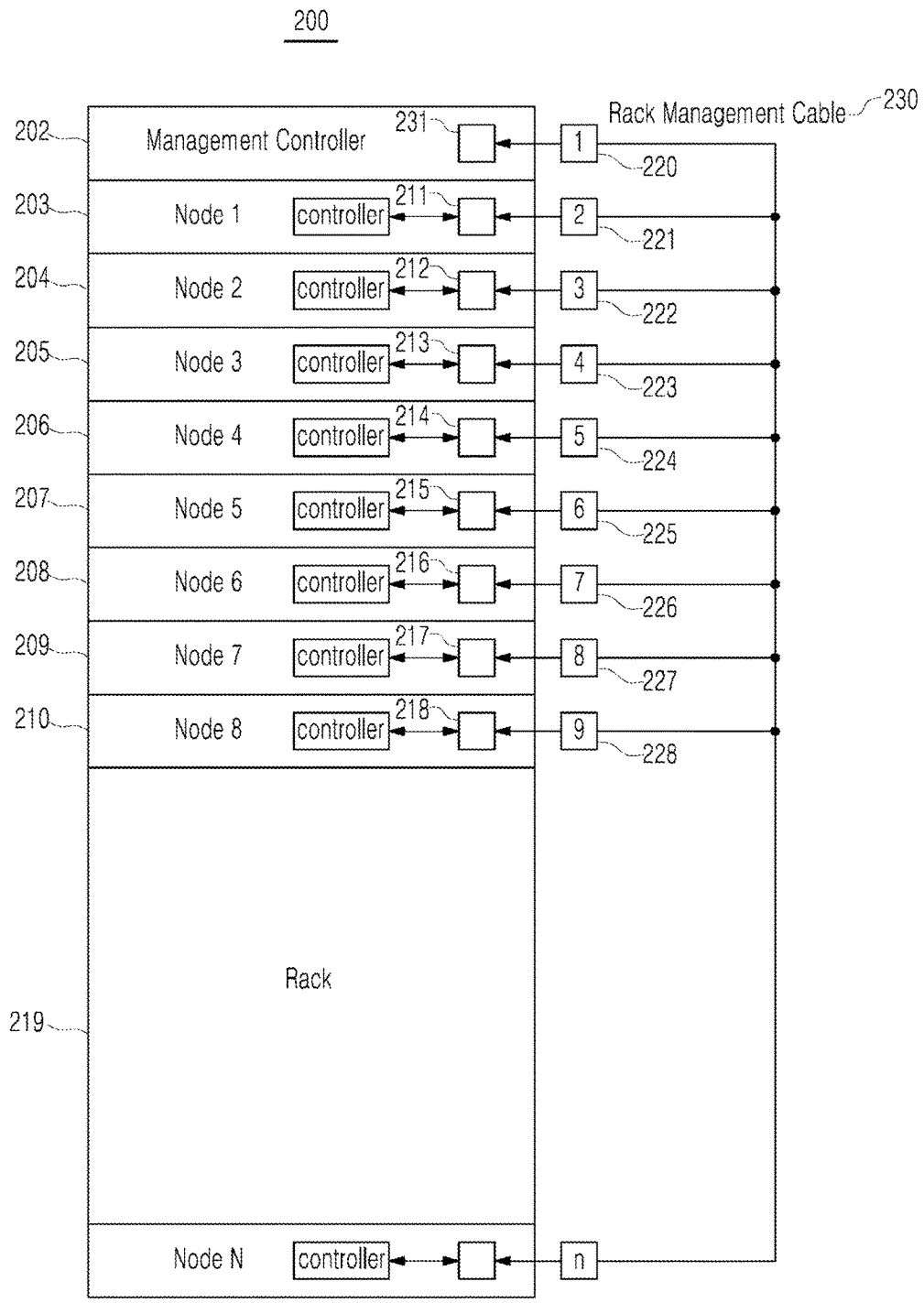
FIG. 2 illustrates a block diagram of exemplary embodiment of smart plug rack management system configurations.

As described above, a rack system 219 can be maintained using a smart plug device and a rack management cable. FIG. 2 illustrates a block diagram of exemplary embodiments of cabling rack management system configurations 200. In the present technology, each server node is associated with a corresponding smart plug device. For example, as illustrated in FIG. 2, a server node 1 203 is associated with a smart plug ID #2 221, a server node 2 204 is associated with a smart plug ID #3 222, a server node 3 205 is associated with a smart plug ID #4 223, and so forth. A smart plug device is a device with a unique I2C address that bridges the management controller 202 and the server nodes 203-210. The smart plug device can further facilitate transmission of the I2C packets and communication between the management controller (e.g. management node) 202 and the server nodes 203-210 by using a designated smart plug unique address (ID number).

For example, a smart plug may include a unique plug address (e.g. ID number) embedded in its table header. Some table headers may include a pre-programmed I2C address that is associated with the plug ID number. The smart plug may contain a table that has matching information of a corresponding server node and a smart plug ID number. This information can be used for matching a smart plug with a corresponding server node. For example, the smart plug #2 will include in its memory that the smart plug #2 221 is associated with the server node 1 203, and smart plug #3 222 is associated with the server node 2 204. Thus, if an incorrect smart plug is plugged into a server node, the smart plug that received the wrong data packets will determine that the packet is not directed to the current smart plug. Consequently, the smart plug will not transmit the packet to the corresponding server node. Instead, the smart plug will reroute the packets to an appropriate smart plug or ignore the data packets.

The smart plug may include an I2C device (built-in USB to I2C converter). The unique ID may be included in a preprogrammed chip in the converter before shipping. The management controller 202 may also learn ("acquire") the smart plugs unique address information as it will incorporate these unique addresses into the data packets when sending and receiving the data packets.

The server nodes 203-210 may be interconnected to the management node 202 through a rack management cable 230. The rack management cable 230 may be referred to as an I2C standard Bus Specification for transmitting data, and is a synchronous serial consisting of clock (SCL) and data (SDA) lines. The rack management cable 230 may be an Inter-Integrated Circuit (I2C) bus that can address a server node location and communicate with the server node. In some embodiments, I2C bus (e.g. rack management cable) may connect a master device to a slave device. For example, a master device (e.g. management node) 202 is connected to a plurality of slave devices (e.g. smart plugs ID #2-9 for the server nodes 1-8 221-228 through the rack management cable 230.

Management node 202 can generate a bus clock signal and initiate communication on the rack management cable 230. The packet message can be transmitted according to an I2C bus protocol of the I2C bus 230. The rack management cable 230 may be configured to communicate with each of server nodes and to address a server node location. Although FIG. 2 describes that the management cable 230 is connected to eight smart plugs, this number is only an example and the management cable 230 can handle more or less smart plugs. For example, it may handle more than forty smart plug devices.

The smart plugs are typically coupled to the nodes through various types of connectors 231, 211-218. The types of ports range from a USB port, I2C port, Serial Port to Ethernet and etc. USB connector type will be described in connection with FIG. 3 and the I2C connector type will described in connection with FIG. 4. The types of connectors described above are not an exclusive list and there may be other types of connectors that are compatible with the smart plug devices.

In some embodiments, the management controller (e.g. management node) 202 may include a Top of Rack (TOR) Switch and/or a Rack Management Controller (RMC). The management node 202 may store routing information in a routing table managed by a routing information base (RIB). The routing table may contain a searchable data structure that includes smart plug's I2C addresses with a corresponding server node address. The routing table does not have to be organized as a table, but it may be some type of searchable data structure. The smart plug's I2C address is mapped with server node addresses. When a packet request is sent from the management node, the packet's destination address may be used to identify a correct smart plug from a routing table entry containing routing information associated with the destination address. The packet request may also include the management node's address for a response packet forwarded back to the management node from the server node.

Each of server nodes may also include a controller. The controller described herein can be a Baseboard Management Controller (BMC) that operates independently of the CPU to support management tasks for the server. The BMC may include a unique IP address. The BMC may also be associated with different types of ports/connectors depending on the smart plug configuration which will be further described as below.

Figure 3:
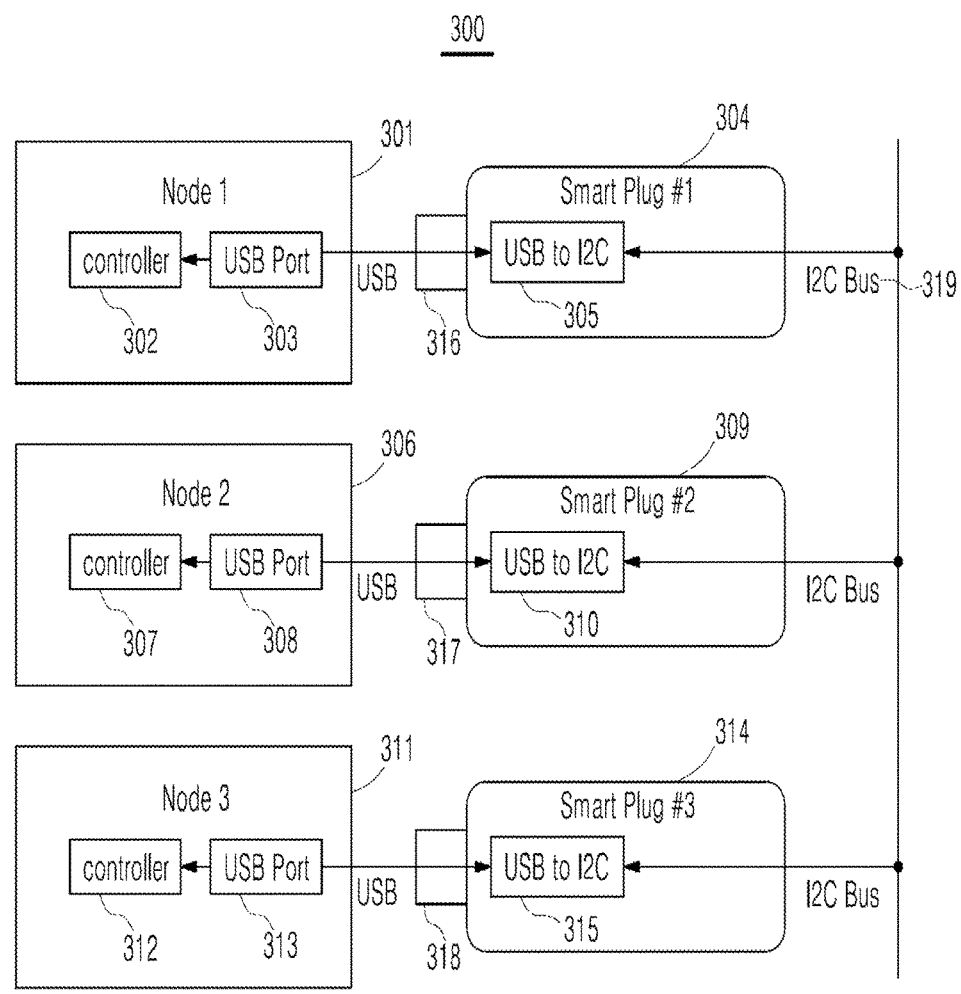
FIG. 3 illustrates a block diagram of exemplary embodiment of smart plug configurations.

FIG. 3 illustrates a block diagram of exemplary embodiments of smart plug configurations 300. In some embodiments, the smart plug may include a USB to I2C converter 305, 310, 315 that converts the smart plug's I2C address to accommodate with the USB interface in the server node 301, 306, 311. The smart plug provides interface between the I2C bus 319 and the server node 301, 306, 311. Each converter may be a microcontroller that is pre-programmed with a slave I2C address prior to installation. For example, the smart plug #1 304 may include a designated I2C address of 0X04 (unique address), smart plug #2 309 may include a designated I2C address of 0X06, and smart plug #3 314 may include a designated I2C address of 0X08. Each of smart plug's unique address may be different from each other's addresses.

As described above, the controller (e.g. BMC) 302, 307, 312 in the server node may be associated with a Universal Serial Bus (USB) port 303, 308, 313. The controller to USB module handles the USB protocol that can read and write the translated I2C packets. USB port 303, 308, 313 of each server node may receive a USB connector 316-318 of the smart plug.

In some embodiments, the management node may store its routing information in a routing table managed by a routing information base (RIB). The routing table may contain a searchable data structure that includes smart plug's I2C addresses with a corresponding server node address. The routing table does not have to be organized as a table, but it may be some type of searchable data structure. The smart plug's I2C address is mapped with server node addresses. When a packet request is sent from the management node, the packet's destination address may be used to identify a correct smart plug from a routing table entry containing routing information associated with the destination address.

To identify a correct server node, the management node will identify an address of smart plug that the destination server node is associated with, when sending a request message. In some embodiments, if the management packet is directed to an incorrect smart plug (e.g. due to an incorrect installation of a smart plug to the server node), the packet request may be ignored after a period of pre-determined time. For example, the management node will retrieve the mapping information from the routing table, and will identify that the smart plug #2 309 is associated with the server node 2 306. To send the request package to the server node 2, the management node will send the request package to the smart plug #2—so the smart plug #2 can transmit the request package to the server node 2. In the event that the smart plug #2 was not plugged into the server node 2, the smart plug #2 will not forward the request package upon receiving the package. If there is no response package forwarded to the management node after some time, the response package will be expired and ignored. This failure event may be reported to the management node and will be logged.

Figure 4:
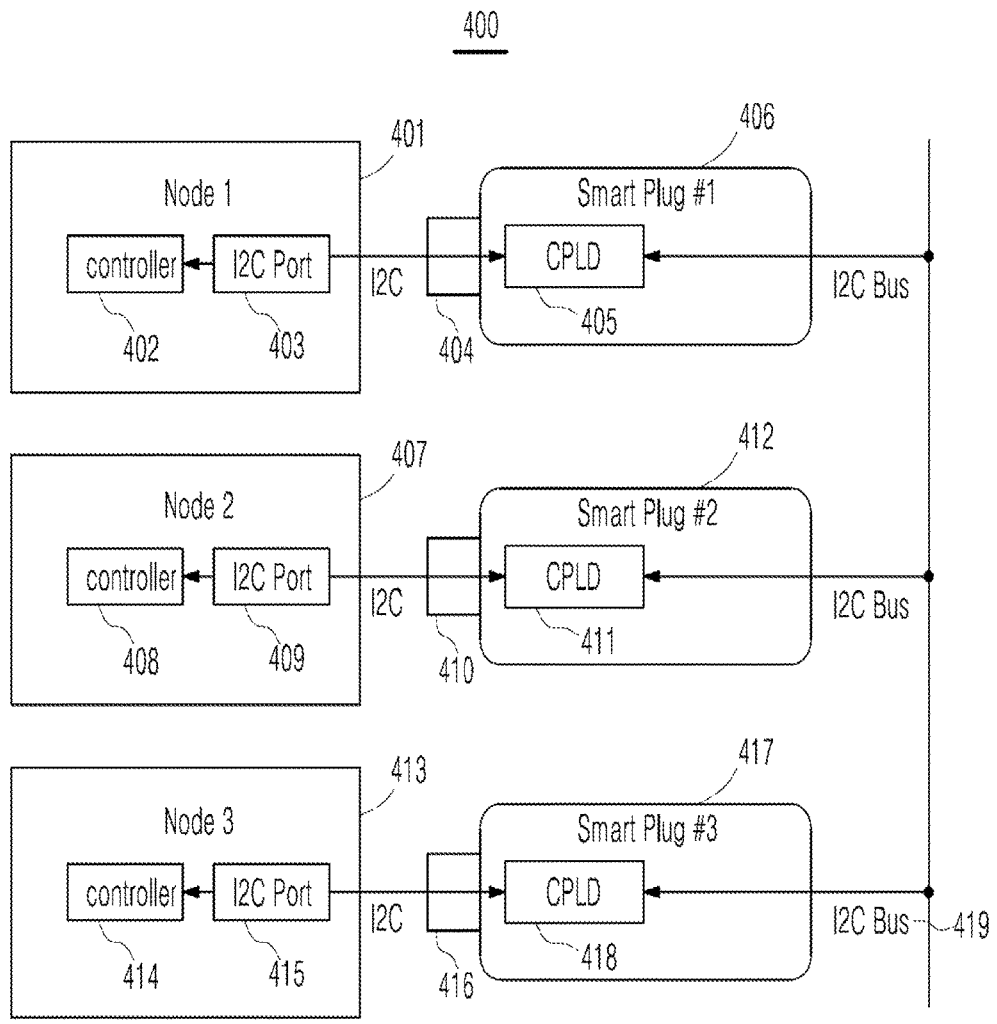
FIG. 4 illustrate a block diagram of exemplary embodiment of smart plug configurations.

FIG. 4 illustrates a block diagram of exemplary embodiments of smart plug configurations 400. In some embodiments, the smart plug device is configured to include a Complex Programmable Logic Device (CPLD) that translates smart plug's I2C slave address to an address compatible with the server node interface. For example, a server node 401 may include a controller 402 and a port (e.g. I2C port) 403 to receive a smart plug 406. The port 403 can be an I2C port to receive the I2C plug 404 of the smart plug 406. Same configuration goes for the node 2 407 and the node 3 413. A server node 407, 413 may include a controller 408, 414 and a port (e.g. I2C port) 409, 415 to receive a smart plug 412, 417. Ports of each server node can be I2C ports to receive the I2C plugs 410, 416 of the smart plugs 412, 417.

In some embodiments, the slave address of the server nodes 1-3 401, 407, 413 may be the same. For example, the controller address 402, 408, 414 of the server nodes 1-3 401, 407, 414 may be 0X24. Thus, locating the server node by the server node slave address may not be possible, since the controller address of each server node is identical for all the server nodes. In the present technology, the management node can use smart plug's unique I2C address to locate a designated server node instead. For example, each smart plug will provide an identifying means for the nodes with respect to the management node.

For example, assume that all of the server nodes are assigned a slave address of 0X24. The smart plug #1 406 can be configured to have an I2C address of 0X04, the smart plug #2 412 can be configured to have an I2C address of 0X06, and the smart plug #3 417 can be configured to have an I2C address of 0X08. When each of smart plugs receives I2C packets directed to them, through the I2C bus 419, the smart plugs will translate the I2C slave address to 0X24 to be compatible with the corresponding server node address. For example, if the smart plug #2 412 receives the packet message directed to the address of 0X06, the smart plug #2 412 will determine that the packet is directed to the controller, and will forward the packet to the node 2 controller 408.

In the event that a smart plug is incorrectly plugged into a wrong server node and a request package is sent to the incorrect smart plug instead, the smart plug may ignore the request package. For example, if the smart plug #2 receives the request packet directed to the address of 0X08 (smart plug #3's address), then the smart plug #2 will either ignore the request or re-route the packet to a correct smart plug (smart plug #3). The management node may wait for a pre-determined period of time to receive a response package back from the correct smart plug. If the response package is not received at the management node within a pre-determined time interval, then the request package will be dropped. It will prompt the management node to re-send a new request package to a different node.

In accordance with the I2C protocol, when the request packet is received at the server node, the request packet may include at least the smart plug's I2C address and the management node's address in its header. When the server node sends a response packet back to the management node, it may identify the destination management node and its address from the request package. It will be understood by those skilled in the art that the slave address shown above are merely an example, and various slave address or embodiments can be used in the current network architecture.

Figure 5:
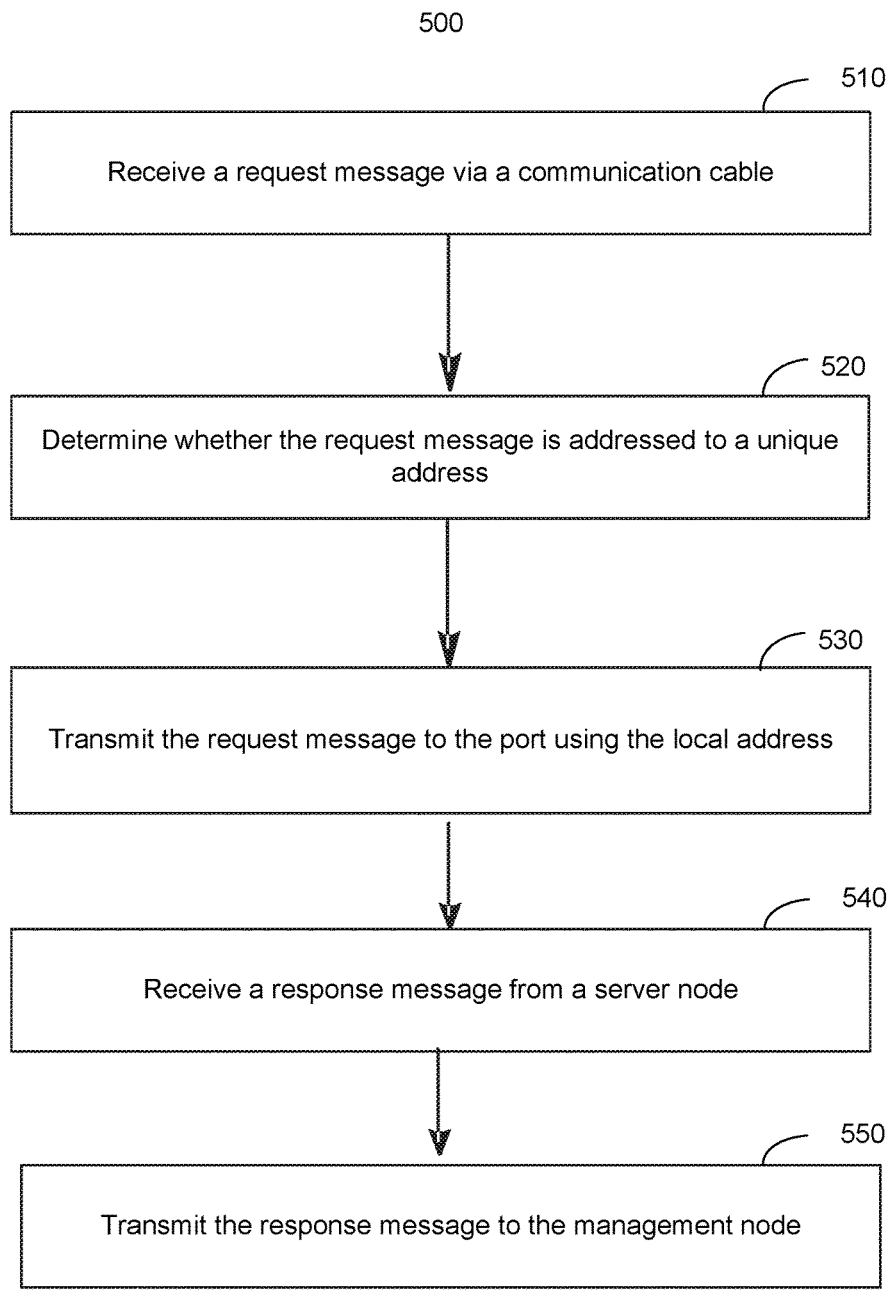
FIG. 5 illustrates a flow chart of an exemplary method of communicating with a server node in a rack system.

FIG. 5 illustrates a flow chart 500 of an exemplary method of communicating with a server node in a rack system. The sequence starts at step 510, and continues to step 550, where it begins with a request message being transmitted to the server node and a response message being transported back to the management node. At step 510, a management controller receives a request message via a communication bus. The request message can be any types of request including a request to retrieve information from the server node or request to check availability of the server node. At step 520, the smart plug is configured to determine whether the request message is addressed to the unique address of the smart plug. The unique address may be included in the header of the request message. At step 530, the smart plug transmits the request message to the port associated with the smart plug using the local address, in response to determining that the request message is addressed to the unique address.

At step 540, the smart plug receives a response message from the port of the server node. The server node determines the destination address of the response message from the routing information in the request message. It may be included in a header of the request message. The response message addressing the request message is forwarded to the smart plug's unique address. The response message may include the requested information from the management node. At step 550, the smart plug is configured to transmit the response message to the management node.

Figure 6:
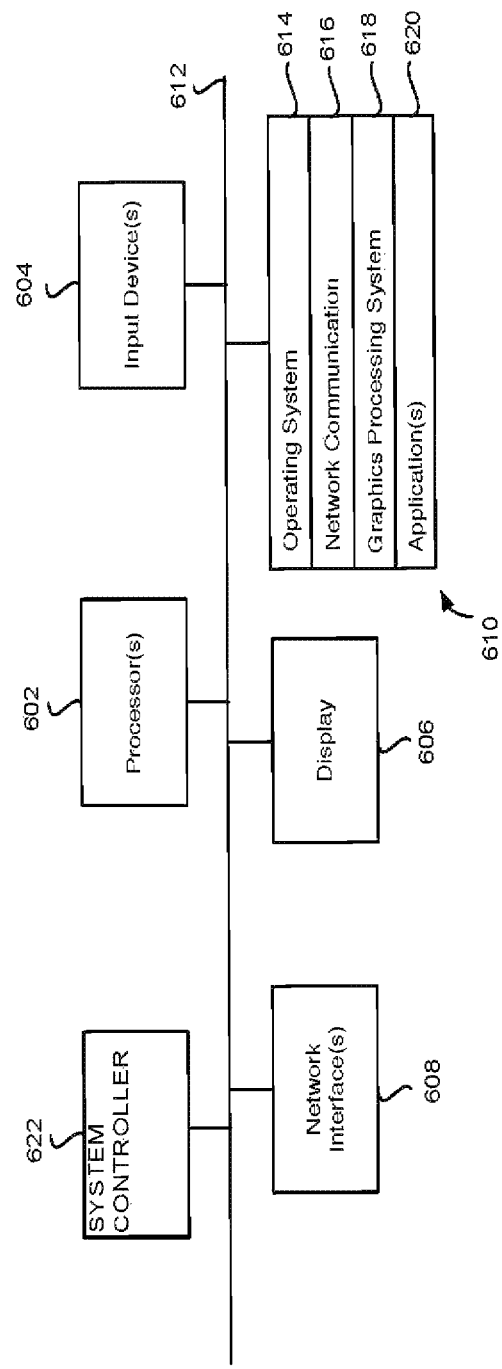
FIG. 6 illustrates a block diagram of an exemplary computer system.

FIG. 6 is a block diagram of exemplary system architecture 600 implementing the features and processes of FIGS. 1-5. The architecture 600 can be implemented on any electronic device that runs software applications derived from compiled instructions, including without limitation personal computers, servers, smart phones, media players, electronic tablets, game consoles, email devices, etc. In some implementations, the architecture 600 can include one or more processors 602, one or more input devices 604, one or more display devices 606, one or more network interfaces 608 and one or more computer-readable mediums 610. Each of these components can be coupled by bus 612.

Display device 606 can be any known display technology, including but not limited to display devices using Liquid Crystal Display (LCD) or Light Emitting Diode (LED) technology. Processor(s) 602 can use any known processor technology, including but are not limited to graphics processors and multi-core processors. Input device 604 can be any known input device technology, including but not limited to a keyboard (including a virtual keyboard), mouse, track ball, and touch-sensitive pad or display. Bus 612 can be any known internal or external bus technology, including but not limited to ISA, EISA, PCI, PCI Express, NuBus, USB, Serial ATA or FireWire.

A computer-readable medium 610 can be any medium that participates in providing instructions to processor(s) 602 for execution, including without limitation, non-volatile storage media (e.g., optical disks, magnetic disks, flash drives, etc.) or volatile media (e.g., SDRAM, ROM, etc.). However, when mentioned, non-transitory computer-readable storage media, computer-readable storage media, and computer-readable storage devices expressly exclude media such as energy, carrier signals, electromagnetic waves, and signals per se.

Computer-readable medium 610 can include various instructions 614 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 can establish and maintain network connections (e.g., software for implementing communication protocols, such as TCP/IP, HTTP, Ethernet, etc.).

A graphics processing system 618 can include instructions that provide graphics and image processing capabilities. Application(s) 620 can be an application that uses or implements the processes described in reference to FIGS. 1-5. The processes can also be implemented in operating system 614.

Service controller 622 can be a controller that operates independently of processor(s) 622 and/or operating system 614. In some implementations, service controller 622 can be powered and operational before processor(s) 602 are powered on and operating system 614 is loaded into processor(s) 602. For example, service controller 622 can provide for pre-OS management of the computing device through a dedicated network interface or other input device. For example, system controller 622 can be a baseboard management controller (BMC) that monitors device sensors (e.g., voltages, temperature, fans, etc.), logs events for failure analysis, provides LED guided diagnostics, performs power management, and/or provides remote management capabilities through an intelligent platform management interface (IPMI), keyboard, video, and mouse (KVM) redirection, serial over LAN (SOL), and/or other interfaces. Service controller 622 can be implement the processes described with reference to FIGS. 1-5 above.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computing device, comprising:
   a management node and a plurality of computing nodes, each of the management node and the plurality of computing nodes each having a port and local address for out-of-band communications associated with the port;
   a communications bus;
   a plurality of smart plugs, each one of the plurality of smart plugs coupling the port for each of the management node and the plurality of computing nodes to the communications bus, each of the plurality of smart plugs having a unique address on the communications bus and being configured to:
   receive a request message via the communications bus;
   determine whether the request message is addressed to the unique address; and
   in response to determining whether the message is addressed to the unique address, reformat the request message compatible with the port using the local address.

2. The computing device of claim 1, wherein a one of the plurality of smart plugs associated with the management node is further configured to:
   receive a node information request from the management node;
   identify the plurality of smart plugs coupling the plurality of computing nodes to the communications bus to yield a matching smart plug; and
   in response to yielding the matching smart plug, transmit the node information request to the port using the local address.

3. The computing device of claim 1, wherein the one of the plurality of smart plugs associated with the management node is further configured to:
   reformat the request message compatible with a USB port using the local address.

4. The computing device of claim 1, wherein the one of the plurality of smart plugs comprises at least a USB to I2C convertor, the USB to I2C converter comprises a preconfigured unique I2C slave address.

5. The computing device of claim 1, wherein the one of the plurality of smart plugs associated with the management node is further configured to:
   reformat the request message compatible with a I2C port using the local address.

6. The computing device of claim 5, wherein the one of the smart plugs comprises at least a complex programmable logic device (CPLD) that converts the unique address to a controller address associated with the each of the plurality of computing nodes.

7. The computing device of claim 1, wherein a controller associated with the each of the plurality of computing nodes is a baseboard management controller (BMC).

8. The computing device of claim 1, wherein the communication cable is an I2C bus.

9. The computing device of claim 1, wherein the one of the plurality of smart plugs is configured to detect a current connection status of each of the plurality of computing nodes to the management node.

10. The computing device of claim 1, wherein the one of the plurality of smart plugs associated with the management node is further configured to:
   in response to receiving the request message, receive a response message from the port;
   reformat the response message compatible with the management node; and
   transmit the response message to the management node.

11. A method, comprising:
   receiving a request message via the communications bus, each one of a plurality of smart plugs coupling a port for each of management node and a plurality of computing nodes to the communication bus;
   determining whether the request message is addressed to a unique address, each of the plurality of smart plugs having the unique address on the communication bus; and
   in response to determining whether the request message is addressed to the unique address, transmitting the request message to the port using local address, each of the management node and the plurality of computing nodes each having the port and the local address for out-of-band communications associated with the port.

12. The method of claim 11, further comprising:
   receiving a node information request from the management node;
   identifying the plurality of smart plugs coupling the plurality of computing nodes to the communications bus to yield a matching smart plug; and
   in response to yielding the matching smart plug, transmitting the node information request to the port using the local address.

13. The method of claim 11, further comprising:
   reformatting the request message compatible with a USB port using the local address.

14. The method of claim 11, wherein the one of the plurality of smart plugs comprises at least a USB to I2C convertor, the USB to I2C converter comprises a preconfigured unique I2C slave address.

15. A non-transitory computer-readable medium storing instructions which, when executed by a smart plug device, cause the smart plug device to perform operations comprising:
   receiving a request message via the communications bus, each one of a plurality of smart plugs coupling a port for each of management node and a plurality of computing nodes to the communication bus;
   determining whether the request message is addressed to a unique address, each of the plurality of smart plugs having the unique address on the communication bus; and
   in response to determining whether the request message is addressed to the unique address, transmitting the request message to the port using local address, each of the management node and the plurality of computing nodes each having the port and the local address for out-of-band communications associated with the port.

16. The non-transitory computer-readable medium of claim 15, wherein the instructions, when executed, further cause the smart plug device to perform operations comprising:
   reformatting the request message compatible with a I2C port using the local address.

17. The non-transitory computer-readable medium of claim 15, wherein the smart plug comprises at least one complex programmable logic device (CPLD) that converts the unique address to a controller address associated with the each of the plurality of computing nodes.

18. The non-transitory computer-readable medium of claim 15, wherein the unique address is an I2C address assigned to the one of the plurality of smart plugs.

19. The non-transitory computer-readable medium of claim 15, the one of the plurality of smart plugs is configured to detect a current connection status of each of the plurality of computing nodes to the management node.

20. The non-transitory computer-readable medium of claim 15, wherein the instructions, when executed, further cause the smart plug to perform operations comprising:
   receiving, from the port, a response message, in response to the request message;
   reformatting the response message compatible with the management node; and
   transmitting the response message to the management node.

* * * * *